(12) United States Patent
Santos et al.

(10) Patent No.: US 11,416,774 B2
(45) Date of Patent: Aug. 16, 2022

(54) METHOD FOR VIDEO RECOGNITION CAPABLE OF ENCODING SPATIAL AND TEMPORAL RELATIONSHIPS OF CONCEPTS USING CONTEXTUAL FEATURES

(71) Applicants: SAMSUNG ELETRÔNICA DA AMAZÔNIA LTDA., São Paulo (BR); UNIVERSIDADE FEDERAL DE MINAS GERAIS - UFMG, Minas Gerais (BR)

(72) Inventors: Jesimon Barreto Santos, Minas Gerais (BR); Victor Hugo Cunha de Melo, Minas Gerais (BR); William Robson Schwartz, Minas Gerais (BR); Otávio Augusto Bizetto Penatti, São Paulo (BR)

(73) Assignees: SAMSUNG ELECTRONICA DA AMAZONIA LTDA., Campinas (BR); UNIVERSIDADE FEDERAL DE MINAS GERAIS-UFMG, Belo Horizonte (BR)

( * ) Notice: Subject to any disclaimer, the term of this patent is extended or adjusted under 35 U.S.C. 154(b) by 0 days.

(21) Appl. No.: 16/849,350

(22) Filed: Apr. 15, 2020

(65) Prior Publication Data
US 2021/0125100 A1    Apr. 29, 2021

(30) Foreign Application Priority Data

Oct. 23, 2019  (BR) ............... 10 2019 022207 7
Nov. 21, 2019  (BR) ............... 10 2019 024569 7

(51) Int. Cl.
*G06N 20/00*    (2019.01)
*G06K 9/62*    (2022.01)
*G06F 16/583*    (2019.01)

(52) U.S. Cl.
CPC .......... *G06N 20/00* (2019.01); *G06F 16/583* (2019.01); *G06K 9/6215* (2013.01)

(58) Field of Classification Search
CPC ..... G06N 20/00; G06F 16/583; G06K 9/6215
See application file for complete search history.

(56) References Cited

U.S. PATENT DOCUMENTS 10,068,204 B2 *  9/2018  Gou ................... G06Q 10/107
10,430,685 B2 * 10/2019  Mathieu .............. G06N 3/0472
10,482,334 B1 * 11/2019  Chen .................... G06N 3/08
(Continued)

OTHER PUBLICATIONS

Melo, Victor et al., Object-Based Temporal Segment Relational Network for Activity Recognition, Oct. 2018, IEEE, pp. 103-109 (Year: 2018).*

*Primary Examiner* — Lewis G West
(74) *Attorney, Agent, or Firm* — Staas & Halsey LLP (57) ABSTRACT

The proposed invention aims at encoding contextual information for video analysis and understanding, by encoding spatial and temporal relationships of objects and the main agent in a scene. The main target application of the invention is human activity recognition. The encoding of such spatial and temporal relationships may be crucial to distinguish different categories of human activities and may be important to help in the discrimination of different video categories, aiming at video classification, retrieval, categorization and other video analysis applications.

11 Claims, 7 Drawing Sheets

(56) References Cited

U.S. PATENT DOCUMENTS

| | | |
|---|---|---|
| 2017/0091537 A1 | 3/2017 | Wnuk et al. |
| 2017/0364766 A1* | 12/2017 | Das .................... G06K 9/00664 |
| 2018/0137389 A1* | 5/2018 | Mathieu ............. G06K 9/00718 |
| 2020/0086858 A1* | 3/2020 | Yao ................... B60W 30/0956 |
| 2020/0086879 A1* | 3/2020 | Lakshmi Narayanan ................... G06N 3/0445 |
| 2020/0387740 A1* | 12/2020 | He ........................... G06T 3/40 |

* cited by examiner

FIGURE 2B (a) *common spatial pyramid*

(b) *egocentric pyramid*

FIGURE 3

| Entry | Approach | 1st split |
|---|---|---|
| #1 | Baseline – Object responses – Jain et al. – "What do 15,000 object categories tell us about classifying and localizing actions?" (*IEEE Computer Vision and Pattern Recognition*) | 65.00% |
| #2 | Object responses (Jain et al.) using a state-of-the-art, 200 object categories detector | 70.00% |
| #3 | Number of occurrences | 65.00% |
| #4 | Fusion of object responses (#2) and number of occurrences (#3) | 72.00% |
| #5 | Spatial pyramid (2 levels) | 73.37% |
| #6 | Spatial pyramid (3 levels) | 73.52% |
| #7 | Egocentric pyramid | 73.98% |
| #8 | Temporal egocentric relational network (TERN) | 75.90% |

FIGURE 4

| Reference | Approach | Splits | | | Average |
|---|---|---|---|---|---|
| | | Split 01 | Split 02 | Split 03 | |
| Baseline – Wang et al. – "Towards Good Practices for Very Deep Two-stream ConvNets" | Spatial stream | 79.8% | 77.3% | 77.8% | 78.4% |
| | Temporal stream | 85.7% | 88.2% | 87.4% | 87.0% |
| | Two-stream | 90.9% | 91.6% | 91.4% | 91.4% |
| Baseline – Wang et al. – "Temporal Segment Networks: Towards Good Practices for Deep Action Recognition" | Spatial stream (TSN) | 85.5% | 84.9% | 84.5% | 85.1% |
| | Temporal stream (TSN) | 87.6% | 90.2% | 91.3% | 89.7% |
| | Two-stream (TSN) | 93.5% | 94.3% | 94.5% | 94.0% |
| Fusion of our approach with two-stream networks | TERN | 75.90% | 76.34% | 73.51% | 75.25% |
| | TERN + spatial stream | 88.77% | 87.31% | 87.47% | 87.85% |
| | TERN + temporal stream | 87.91% | 90.98% | 89.70% | 89.53% |
| | TERN + two-stream | 92.33% | 93.04% | 92.85% | 92.74% |
| | TERN + spatial stream (TSN) | 86.14% | 85.09% | 84.26% | 85.1% |
| | TERN + temporal stream (TSN) | 88.01% | 91.05% | 90.95% | 90.00% |
| | TERN + two-stream (TSN) | 93.64% | 94.24% | 94.23% | 94.04% |

METHOD FOR VIDEO RECOGNITION CAPABLE OF ENCODING SPATIAL AND TEMPORAL RELATIONSHIPS OF CONCEPTS USING CONTEXTUAL FEATURES

CROSS-REFERENCE TO RELATED APPLICATIONS

This application claims the benefit of Brazilian Application No. 10 2019 022207 7, filed Oct. 23, 2019 and Brazilian Application No. 10 2019 024569 7, filed Nov. 21, 2019, in the Brazilian Intellectual Property Office, the disclosures of which are incorporated herein by reference.

TECHNICAL FIELD

The present invention relates to a method for recognition of human activities that considers objects occurrences and their temporal and spatial relationships. Initially, the invention can be embedded into cameras in order to enable the understanding of video data in terms of human activities. In addition, vision-based monitoring systems can make use of the invention for video analysis and understanding. A wide range of applications can benefit from the invention, including for example, activity recognition in sports videos, suspect activity monitoring in video surveillance systems (e.g., in airports, bus stations, metro stations, and other public places), health monitoring using cameras for detecting falls and other events (e.g., elderly care), video-based traffic monitoring systems (e.g., for detecting traffic accidents), personal video library finder/organizer (e.g., finding relevant activities in personal videos), etc.

The proposed invention represents an innovation for the analysis and understanding of video data in terms of human activity recognition and can provide a competitive advantage in the market. The proposed invention can effectively make use of context information encoding the spatial and temporal relationship of the elements appearing in the video scene. For instance, the proposed invention can be used to recognize what activities are being performed in a video, on YouTube for example, and help with retrieval and recommendation. Activity recognition can also be used to trigger recording in monitoring cameras, like in Google Clips or other personal and professional cameras.

BACKGROUND OF THE INVENTION

Video monitoring systems are getting more important given the high availability of cameras in many different places and scenarios. The understanding of this huge amount of video information becomes extremely important in order to make video data useful, to eliminate or reduce the cost of manual video analysis, and to improve decision-making process based on video information, just to name a few benefits.

Given the recent popularity of mobile devices equipped with high-resolution cameras and the spread of videos and images on the Internet, understanding visual data is also crucial for knowledge extraction from videos and images generated by people.

Currently, Artificial Intelligence (AI) plays an important role in every organization, enabling a new set of applications and functionalities that have impact in the life of millions of people. Video understanding, especially human activity recognition, is one of the leading topics in AI for video data.

Many of the current video understanding techniques lack the analysis of contextual information, which may contribute or even determine the correct interpretation of video content. Specifically, for human activity recognition, context plays an important role. Certain activities are strongly related to its surroundings, which provide important cues for activity discrimination.

Objects, people, pose, scene, background information and other elements available in a video scene are herein considered as context. Not only the presence of such elements, but also their spatial and temporal relationships are very important to determine context information.

For activity recognition, for instance, to differentiate videos of ball-played sports (e.g., soccer, volleyball, basketball, etc.), the spatial and temporal relationships of the ball with the actors are very relevant. The spatial arrangement of the ball with the players may help differentiate between hand-played (volleyball and basketball) versus feet-played sports (soccer), while temporal cues will help differentiate between volleyball and basketball (the player never holds a ball for too long in a volleyball match).

The encoding of such contextual information by spatial and temporal relationships of the objects available in the video is the main aspect of the proposed invention. Therefore, the proposed invention may benefit a large set of applications related to video analysis and understanding.

Patent document WO2014146463 A1, entitled: "BEHAVIOUR RECOGNITION METHOD BASED ON HIDDEN STRUCTURE REASONING", by INSTITUTE OF AUTOMATION, CHINESE ACADEMY OF SCIENCES, published on Sep. 25, 2014, discloses how to model body parts of an estimated human skeleton using a directed graph, which uses features such as HOG3D, HOG, and HOF for classification using SVM, which is not an end-to-end learning architecture. The present invention, on the other hand, may use higher-level semantic concepts or lower-level ones and directly exploits the relationships between concepts using an end-to-end differentiable temporal egocentric relational network. The method of the patent document WO2014146463 A1 does not encode spatial and temporal relationships of concepts and agents, as the present invention does.

Patent document US2017091537, entitled: "ACTIVITY RECOGNITION SYSTEMS AND METHODS", by NANT HOLDINGS IP LLC, published on Mar. 30, 2016, exploits a wide range of input features and models such features using activity graphs, which are then assigned a score using graph similarity scoring techniques. The present invention, however, uses a temporal egocentric relational network to learn the spatial and temporal relationships between the concepts in a fully end-to-end differentiable framework, which allows learning the relationships between objects that matter for the target activity.

Patent document CN104091167 A, entitled: "FEATURE EXTRACTION METHOD BASED ON HUMAN BODY ACTIVITY RECOGNITION OF MOTION SENSING CAMERA", by UNIV ELECTRONIC SCIENCE & TECH, published on Oct. 8, 2014, proposes an activity recognition method based on the human body. For such purpose, the method at the patent document CN104091167 A extracts feature descriptors such as light stream histogram, gradient histograms, and local depth features. Local depth features are extracted similarly to Word Spatial Arrangement ("Visual word spatial arrangement for image retrieval and classification", Penatti et al., Pattern Recognition, 2014), using each interest point within the human body as the center. In contrast to the present invention, the method at the patent works on lower-level concepts, while the present invention leverages higher-level semantics. In addition, the patent lacks a module to learn semantic relationships between the features such as the present invention. Finally, the patent is tailored to tasks comprising depth images, while the present invention is broader, allowing to be applied on datasets with/without depth images.

Document entitled: "Object Bank: A High-Level Image Representation for Scene Classification & Semantic Feature Sparsification", Li et al., NIPS, 2010) uses multiple object detections and extracts histograms of them in a pyramid-fashion as well to harness object granularity and spatial relationships. However, the spatial pyramid is an evenly spaced grid constructed at the center of the frame without targeting any specific object, i.e., it is not built around an object, such as the person executing the action. Thus, the method at the paper only captures the global object distribution of the scene, being independent of which objects are more important. In contrast, the present invention is more general considering multiple contextual cues such as both spatial and temporal information. In addition, object representation of the present invention focuses on capturing the local context regarding the agent performing the activity. The present invention gives more importance to the main objects related to an activity. Furthermore, the method at the paper focuses at scene recognition, while the present invention is tailored for activity recognition.

Document entitled: "WSA—Visual word spatial arrangement for image retrieval and classification", by Penatti et al., Pattern Recognition, 2014 encodes the spatial relationship of visual words for image retrieval and classification. Egocentric pyramids are considered WSA employed for encoding the spatial arrangement of object detections. However, WSA is a lower level descriptor modeling keypoints' arrangement, while egocentric pyramid is oriented towards higher semantic concepts. In addition, the egocentric representation of the present invention includes other contextual cues, such as temporality, which is not encoded by WSA. Finally, WSA lacks a module to learn semantic relationships between the features such as the present invention.

Document entitled: "What do 15,000 object categories tell us about classifying and localizing actions?", Jain et al., CVPR, 2015, exploited the use of objects in the activity recognition task, showing that objects help at recognizing actions. To detect objects, the authors trained an AlexNet-like architecture with dropout on 15,000 object categories from ImageNet. The network was then used to detect the presence of each object, generating a bag-of-words with the probability of each class. The network uses both the object encoding and HOG, HOF, and MBH motion descriptors computed along improved trajectories—a technique to compensate for camera motion. The approach proposed by Jain et al. is different from the present invention in the following aspects: First, the authors focused on object information only. The present invention exploits other sources of contextual cues besides objects, such as temporal relationships. Second, the method at the paper does not consider spatial and temporal relationships between objects. Finally, the method at the paper does not exploit how contextual information relates to the main agent performing an action, which is captured in the present invention.

Document entitled: "Harnessing Object and Scene Semantics for Large-Scale Video Understanding", Wu et al., CVPR, 2016, harnesses both object and scene semantics for large-scale video understanding. Instead of summing over the averaged object response for each action, the authors train a discriminative neural network, the Object-Scene semantic Fusion (OSF) network. The OSF is a multi-layer perceptron (MLP) that learns how to fuse scene, object and generic features. It has three layers, one for each input stream, that is, the object, the scene, and the generic feature streams. Although the approach in the paper also uses other sources for contextual cues besides objects, it does not exploit the egocentric hypothesis and its temporal and spatial relationships of objects such as the present invention.

Document entitled: "Spatio-temporal human-object interactions for action recognition in videos", Escorcia and Niebles, ICCVW, 2013, builds concentric ellipsis around an agent performing an action, in addition to other features such as relative size and occupancy. The method at the paper has limitations, such as using dataset annotations to provide the agent position and assuming that there is a single object in the scene (i.e., it does not consider multiple objects like the present invention). The present invention also builds a pyramid, but as a grid instead, and more importantly, a data-centric approach is employed to learn the semantic relationships between the features, which may comprise objects, the agent, temporal features, among others.

Document entitled: "Two-Stream SR-CNNs for Action Recognition in Videos", Wang et al., BMVC, 2016, exploits contextual information based on objects. The input data for this network is the same from conventional two-stream networks, i.e., RGB and optical flow modalities. However, SR-CNN proposes to add two streams after the last convolutional layer, in addition to the regular stream in two-stream architectures. The first stream remains the same, taking as input the raw activations from the last convolutional layer, capturing global appearance from the entire frame. The second and third streams process contextual information by taking activations from the bounding box of the main agent and the activations from objects' bounding boxes. Each stream is fed to its respective fully connected layers. SR-CNN is different from the present invention as SR-CNN leverages object detections in conjunction with two-stream network in an end-to-end fashion. On the other hand, the present invention seeks to incorporate additional context from other contextual sources and its object representations are based on egocentric pyramids and object pairings. In addition, SR-CNN takes activations from bounding boxes, thus preventing it to capture the spatial arrangement of objects. SR-CNN also does not capture the spatial relationships of objects regarding the main agent, as it is only able to exploit correlations between objects occurrences and the main agent in the fusion layer. Finally, the present invention also employs a temporal egocentric relational network for arbitrary numbers of objects, while SR-CNN uses multiple-instance learning to select relevant objects.

Document entitled: "Going deeper into first-person activity recognition", Ma et al., CVPR, 2016, proposes an approach to leverage object labels and actions for egocentric activity recognition. In egocentric activities, important objects are usually close to the hands of the agent. Thus, the authors argue that detecting hands might be helpful for accurately recognizing the main object and its localization. Ma et al. harnesses hand information for object detection, by fine tuning a FCN32-s architecture trained on hand segmentation to generate object coordinate proposals. Then, the object proposals are fed to another CNN, named ObjectNet, to predict the label of the object. In later stages, the method at the paper combines the predictions generated by an action network (ActionNet) and ObjectNet to generate the activity label. The approach at the paper is different from the present invention, as it focuses in predicting object labels accurately using hand segmentation cues. The method at the paper then uses the features extracted from the object bounding box for classification globally, that is, it does not address how the spatial and temporal arrangement of contextual information and their relationships to the main agent may help in activity recognition, as present invention does.

Document entitled: "A simple neural network module for relational reasoning", Santoro et al., CoRR, 2017, has a similar concept to the present invention, in terms of encoding the relation between objects. However, the paper presents several differences to the present invention. First, it was not originally conceived for activity recognition, so it does not encode temporal information like the present invention allows to do so. Second, the input for the present invention considers objects and agent pairings using egocentric pyramids.

Document entitled: "Egocentric activity recognition with multimodal fisher vector", Song et al., ICASSP, 2016, proposes a technique for fusing features extracted from egocentric videos and sensor data using a Fisher kernel framework. Differently from the present invention, the approach at the paper does not target a main agent to capture spatial/temporal relationships nor leverages a fully end-to-end differentiable framework to extract semantic relationships between a variable number of features/objects, as the present invention does.

Document entitled: "Temporal Relational Reasoning in Videos" by Zhou et al., ECCV, 2018, proposes an architecture for temporal relational reasoning based on relational networks. This approach builds a hierarchical relational network pyramid, with varying time scales, to encode temporal information given CNN features. In contrast, the present invention models both spatial and temporal relationships between objects given by a concept detector. The spatial relationships are obtained by the concepts' coordinates and egocentric pyramid, while the temporal information is encoded through normalized frame position and the Temporal Segment Networks framework.

SUMMARY

The proposed invention aims at encoding contextual information for video analysis and understanding, by encoding spatial and temporal relationships of objects and the main agent in a scene. The main target application of the invention is human activity recognition. The encoding of such spatial and temporal relationships may be crucial to distinguish different categories of human activities and may be important to help in the discrimination of different video categories, aiming at video classification, retrieval, categorization and other video analysis applications.

One advantage of the proposed invention is that it allows an end-to-end training process, which means that the machine can automatically learn the best parameters for understanding the contextual information in terms of spatial and temporal relationships by receiving as input the video itself. Therefore, this eliminates the necessity of manually designing the best features that describe the input data, making it possible to obtain higher accuracy rates and to deliver a better classifier for the target product.

Examples of Direct Applications of the Proposed Invention

Triggers for smartphone camera: some camera features could be started according to the scene being recorded. For example, if some specific actions are detected using the proposed method (e.g., a baseball hit during a baseball match), slow motion or super slow-motion features could start. The proposed method could run every time the camera is being used.

Camera scene optimizer: scene optimizer could be adjusted not only based on static image properties (as it is done nowadays) but also based on video category. By using the proposed method to analyze a set of camera frames (e.g., few seconds), video category could be determined and then camera features could be adjusted to have improved image quality during video or image recording.

Improved gallery: the video gallery of smartphones could have an organization/sorting option based on video categories. Video search could also be improved using the proposed invention to categorize videos. Users could better search for videos of specific activities or categories (e.g., sports events, car racing, dancing, etc.) The proposed invention could run at the same time the image analyzer runs in order to categorize and index gallery contents.

Triggers for health monitoring systems: the proposed invention could run for all the content being recorded/monitored in this type of system and, if some specific actions are detected (e.g., falls), an emergency alert could be given to system operators to ask for attention.

Triggers for video surveillance systems: the proposed invention could run in background for all content being recorded in this type of system and, in case a specific action is detected (e.g., fight, person running among crowd, multiple people running), an emergency alert could be shown to system operators in order to ask for attention.

BRIEF DESCRIPTION OF THE DRAWINGS

The objectives and advantages of the current invention will become clearer through the following detailed description of the example and non-limitative drawings presented at the end of this document.

DETAILED DESCRIPTION

Features of Invention

The proposed invention discloses an approach for human activity recognition on videos, which can encode contextual information by spatial and temporal relationships of objects and the main agent in a scene. Spatial relationships are encoded using temporal egocentric relational network, object occurrences and egocentric pyramids, in which the latter is a technique proposed to encode the spatial arrangement of objects around the main agent in the scene. Temporal relationships are encoded combining relational networks and temporal segment networks. All the encoding steps are differentiable, allowing an end-to-end learning process, which makes it possible to obtain higher recognition rates and to deliver a better classifier for the target product. The proposed approach, although validated for human activity recognition, can be used for other tasks related to video analysis and understanding.

Based on the description of the existing methods and on the description of the proposed invention, the following advantages for the invention can be enumerated:

Encoding contextual information, i.e., both spatial and temporal relationships of objects regarding the main agent in the scene, improves the accuracy for human activity recognition systems based on video data;

Such encoding of contextual information may benefit other video analysis and video understanding applications;

More precise video understanding systems enable better knowledge extraction from video datasets, including better video categorization, better video search, video auto-tagging, video summarization, among other applications;

Better video understanding systems require less human/manual annotation of video content;

Embedding the invention in mobile devices enables better Artificial Intelligence (AI) applications for users;

Better video categorization and video search in mobile applications (e.g., Gallery).

The main goal of the proposed invention is the recognition of human activities based on videos. However, the invention can also be used for any other video analysis application. Input videos are recorded by cameras and may be available from different sources, such as YouTube, surveillance cameras, smart phones, etc. The recognition algorithms can understand the activities performed on video, like horse racing, kayaking, applying lipstick, walking with dog, playing cello, and others.

Figure 1:
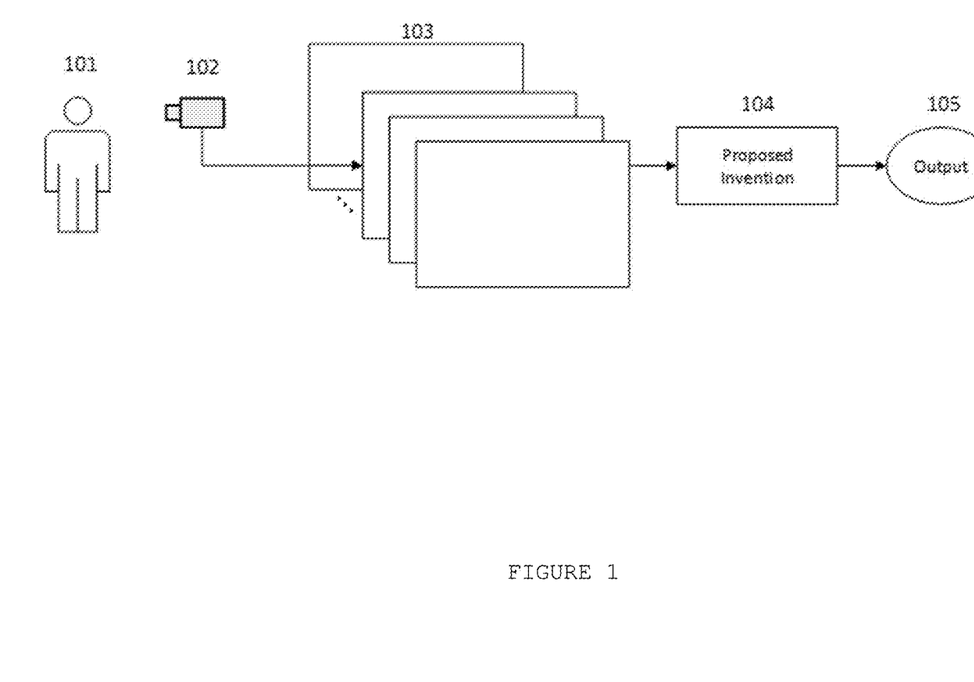
FIG. 1 shows a scenario of the proposed invention being used, in which a scenario or people are being recorded by cameras which generate digital videos.

As shown in FIG. 1, a user or scenario (101) is recorded by a camera (102), generating a video (103). This video (103) is then processed by the present invention (104), which can be executed in a computer, remote server, mobile device, or other device, including cloud servers. Such videos are then processed by the proposed invention in order to produce an output, which are the recognized human activity categories. The recognized activities are the output (105) of the proposed system. The camera device (102) can be an IP camera, a smart phone, a surveillance camera, or any other device comprising a camera. The proposed invention has the advantage of enabling recognition systems to learn contextual relationships for improving accuracy.

Figure 2A:
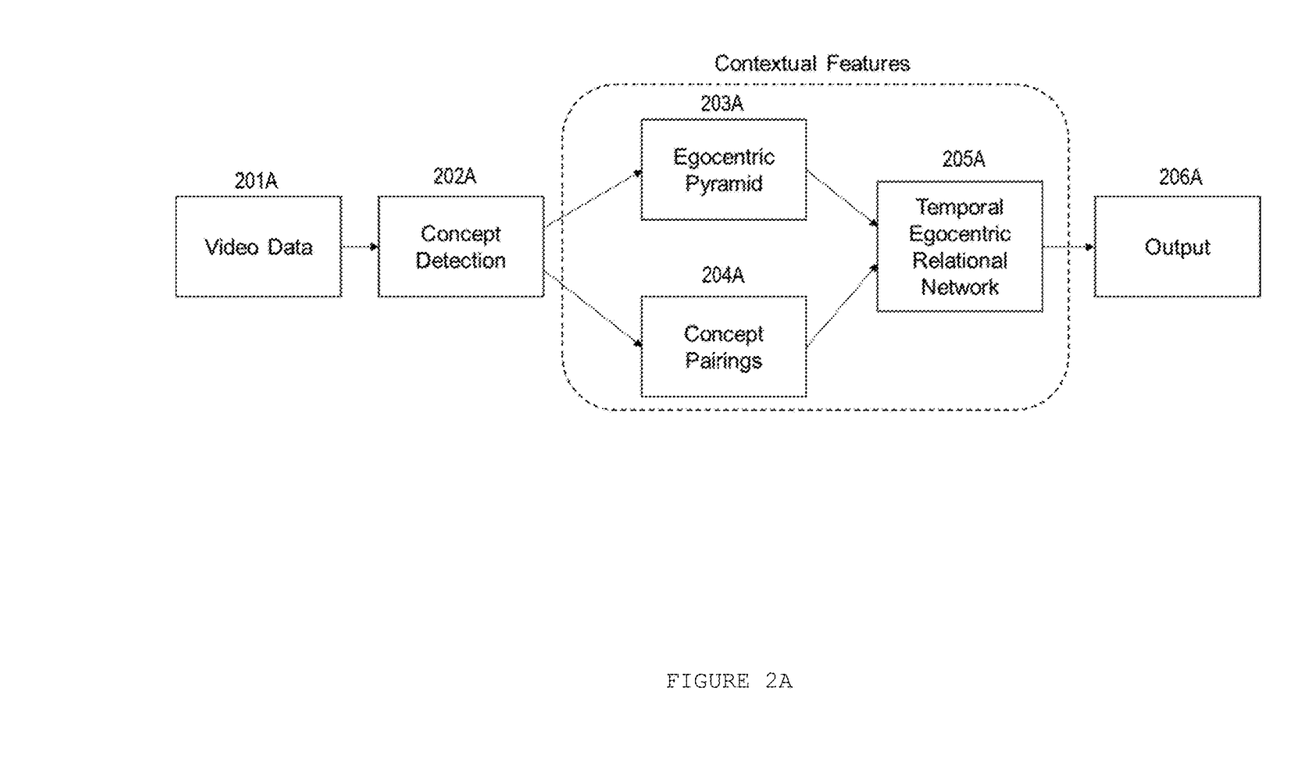
FIG. 2A depicts the pipeline of the proposed approach for the system.

FIG. 2A illustrates the system wherein the proposed invention is performed. FIG. 2A depicts the flowchart of the system, in which the input video data (201A) goes through the concept detection module (202A) in order to obtain the concepts (e.g., objects), then the contextual features are captured by the Egocentric Pyramid (203A) and Concept Pairings module (204A) which have their output processed by the Temporal Egocentric Relational Network (205A), by considering spatial and temporal relationships of concepts, generating the output (206A) of the system. The relationships are computed for both object-agent and object-object pairs and used as input for a neural network, which learns the best concept combinations and parameters.

Figure 2B:
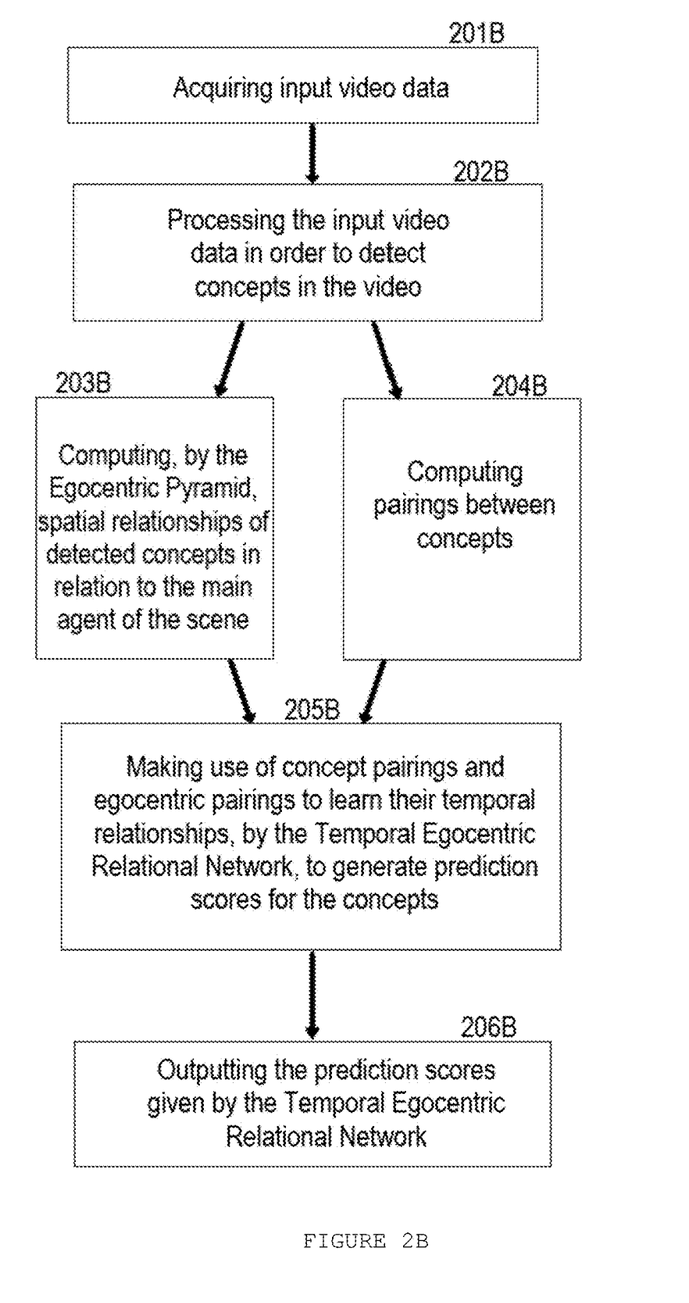
FIG. 2B shows the flowchart of the proposed approach for the method.

FIG. 2B illustrates the steps of the method of the proposed invention. FIG. 2B shows the pipeline of video recognition using contextual features capable of encoding spatial and temporal relationships of concepts comprising the steps of:

a. acquiring input video data (201B);

b. processing the input video data in order to detect concepts in the video (202B);

c. computing contextual features from the detected concepts, further comprising the following sub-steps:

i. computing, by the Egocentric Pyramid, spatial relationships of detected concepts in relation to the main agent of the scene (203B) (concept-agent pairings);

ii. computing pairings between concepts (204B) (concept-concept pairings);

iii. making use of concept pairings and egocentric pairings to learn their temporal relationships, by the Temporal Egocentric Relational Network, to generate prediction scores for the concepts (205B);

d. outputting the prediction scores given by the Temporal Egocentric Relational Network (206B).

The purpose of the invention is to recognize human activities based on video, which is the input video data (201A) of the system. The input video data (201A) is processed in order to detect concepts (202B). Concepts can be objects, people, object parts, etc. The concepts are then passed to the module to generate the contextual features, the egocentric pyramid (203A). Such module is divided into two sub-modules. The egocentric pyramid (203A) obtains information regarding spatial relationships of objects and the main agent in the scene. And the concept pairings module (204A) obtains spatial relationships of pairs of objects. The spatial relationships are used as input for a Temporal Egocentric Relational Network (TERN) (205A), which not only learns the best object pairings, but also their temporal relationships. The output (206A) of the method are the predictions in terms of human activities, considering human activity recognition, or any other video classification task.

The input video data (201A) can be obtained from, including but not limited to, video cameras, smart phones, wearable cameras, surveillance cameras, websites such as YouTube, and others. The input video data (201A) is initially split into t segments of equal size T. From each segment, a random snippet $S_i$ is sampled with length $|S_i|$ such that $|S_i| \leq T$. The video snippets can be used as input for the concept detection module (202A).

The detection of concepts, which can be objects, people, object parts and others, can be based on object detectors including, but not limited to YOLO ("YOLO9000: Better, Faster, Stronger", Redmon and Farhadi, CVPR, 2017), SSD ("SSD: Single shot multibox detector", Liu et al., ECCV, 2016), Faster-RCNN ("Faster R-CNN: Towards real-time object detection with region proposal networks", Ren et al., NIPS, 2015), etc. The concept detection module (202A) outputs all the concepts detected in the input video data (201A).

Figure 3:
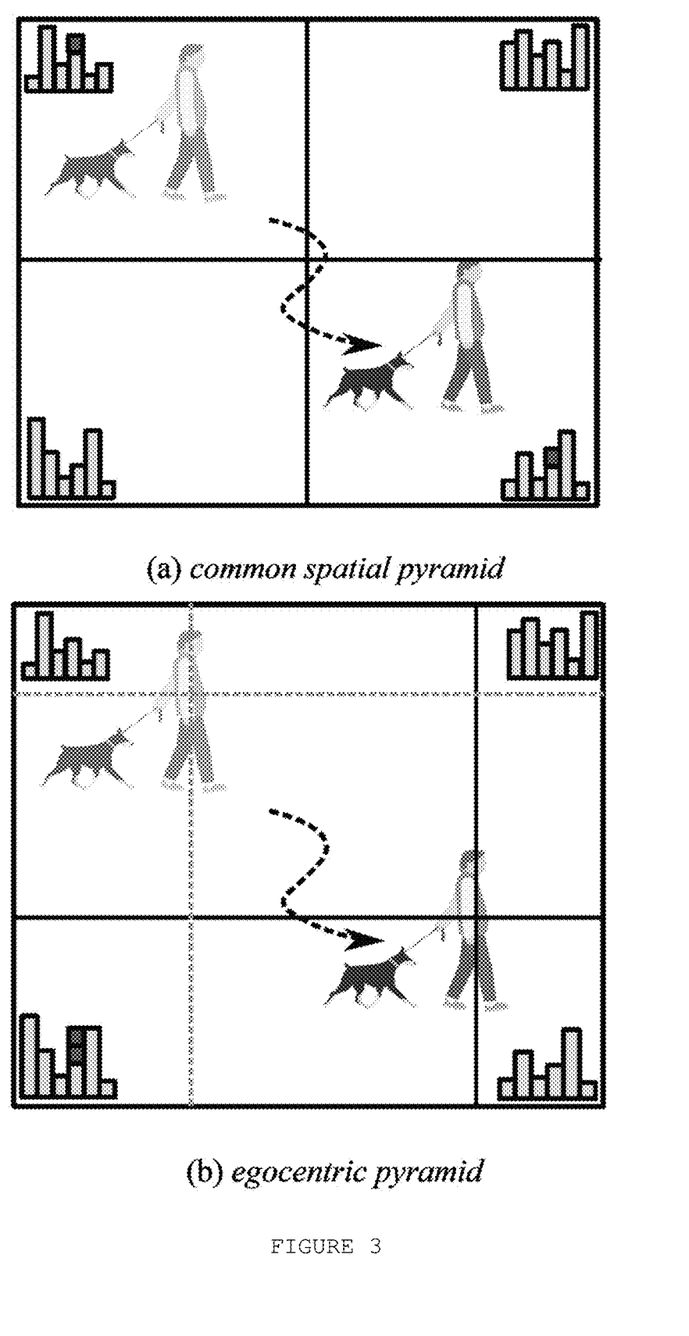
FIG. 3 compares a common spatial pyramid with the proposed egocentric pyramid.

The egocentric pyramid (203A) is responsible to encode spatial relationships between concepts and the main agent in the scene (concept-agent pairings). FIG. 3 shows an egocentric pyramid in comparison with a common spatial pyramid. The egocentric pyramid splits the image space according to the main agent in the scene. An egocentric pyramid takes an agent as reference, and builds a spatial pyramid centered on top of it. An agent is picked as the central concept performing an activity. This may be determined by several ways, including but not limited to, choosing the concept with the highest score assigned by the concept detector; tracking the concept with the highest scores, among others.

An advantage of egocentric pyramid (203A) over common spatial pyramids is that elements surrounding a given agent are invariant to its position. As a common spatial pyramid takes the center of the frame as reference, it can unveil a problem because it assumes that all activities are always performed at the center of the video, which is not necessarily true. For instance, if the walk the dog activity is being targeted and the person escorting the dog starts on the upper-left corner of the frame and then moves to the bottom-right corner, the corresponding 'dog' bin will be assigned into the histograms corresponding to the second and fourth quadrants. That will generate a different histogram signature for the same activity but in one case that the person with the dog starts at the bottom-left and moves to the bottom-right. However, this is prevented by egocentric pyramid as it takes the agent position as reference instead of the frame's center, since the relevant elements move around the one performing the action.

In the egocentric pyramid (203A), in the case a concept is in the boundary of more than one quadrant or a concept is split across multiple quadrants, there are some possibilities to update the corresponding quadrant histograms. One option is to update only the histogram in which the concept has the larger part. Another option is to use the concept dimensions (determined by the bounding box computed by the concept detector) to update all the quadrant histograms weighted by the portion of the concept that belongs to each quadrant.

The egocentric pyramid (203A) can also be used in case there is more than one prominent agent in the scene. This may happen when the scores of the concept detector are similar for more than one concept (e.g., three concepts with scores around 0.3). In this case, all the concepts with similar high scores are used as agents and a separate egocentric pyramid is computed using each concept as the main agent. All these egocentric pyramids can then be used as input for the Temporal Egocentric Relational Network (TERN) (205A).

The concept pairings module (204A) obtains the spatial relationships of all pairs of a concept and other concept (concept-concept pairings).

The concept-agent pairings and concept-concept pairings obtained respectively by Egocentric Pyramids (203A) and Concept Pairings modules (204A), can be used as input for a Temporal Egocentric Relational Network (TERN). That is, the contextual features can be computed by TERN considering only concept-agent information, only concept-concept information or both types of pairings.

For having a machine learning system, it is necessary to first train the method. This learning phase can be based on a given video dataset, in which the system will learn the parameters and generate a classification model. This can happen separately from the system use, i.e., from the inference phase. For instance, the classifier can be trained on a computer/server and then the learned model can be used in a mobile device. It is also possible to have the two phases in the same location. In addition, it is possible to update or re-train the classifier at certain periods of time using new data, which can come from user datasets. The proposed invention has no restriction on where the training and inference phases occur.

The Temporal Egocentric Relational Network (TERN) (205A) makes use of the pairings in order to learn features and classifier in a unified way. TERN is designed to reason over concept information over time, which means that TERN will learn the spatial and temporal relationships for the contextual features. Given a sequence of video snippets $S=\{S_1, S_2, \ldots, S_t\}$ comprising t snippets sampled uniformly or randomly, Temporal Egocentric Relational Network is defined as $$\text{TERN}(S) = \mathcal{G}(R_\Phi(S_1), R_\Phi(S_2), \ldots, R_\Phi(S_t)),$$

where $S_t$ is a video snippet, $R_\Phi$ is a relational network with parameters $\Phi$, $\mathcal{G}$ is a pooling operation. In particular, a relational network $R_\Phi$, given parameters $\Phi=[\phi_1, \phi_2]$, is defined as $$R_\Phi(O) = f_{\phi_1}\left(\frac{1}{n^2}\sum_{o_i, o_j} g_{\phi_2}(o_i, o_j)\right).$$

Here, $O=\{o_i\}_{i=1}^n$ represents an input set of n detected concepts (e.g., objects), where $o_i$ is the i-th concept such that $o_i \in \mathbb{R}^f$; and functions $f_{\phi_1}$ and $g_{\phi_2}$ are stacked multi-layer perceptrons (MLP) parameterized by parameters $\phi_1$ and $\phi_2$, respectively.

The learning procedure outputs a model that will be employed during system use for feature extraction and classification. In this training setting, sampling random snippets is a data augmentation technique where every time a different snippet is seen by the network. At the same time, it is ensured that the video is seen as a whole, according to the number of segments and the snippet length. For instance, if three segments are chosen, then it is ensured that the network will see data from the beginning, middle, and end of the video. The consensus layer then pushes the network to learn weights that favors consistency across them. TERN benefits from efficiently reusing weights between concept pairings and temporal segments. This imposes constraints that act as regularizers, while also reducing the number of parameters, as pointed out by the literature.

All the process of obtaining contextual features in the proposed invention (203B-204B-205B) is differentiable, which means that the system can be trained end-to-end, from concept detections to activity predictions. This allows the system to obtain the best parameters automatically, without requiring human intervention or expert knowledge for the problem domain.

Figure 4:
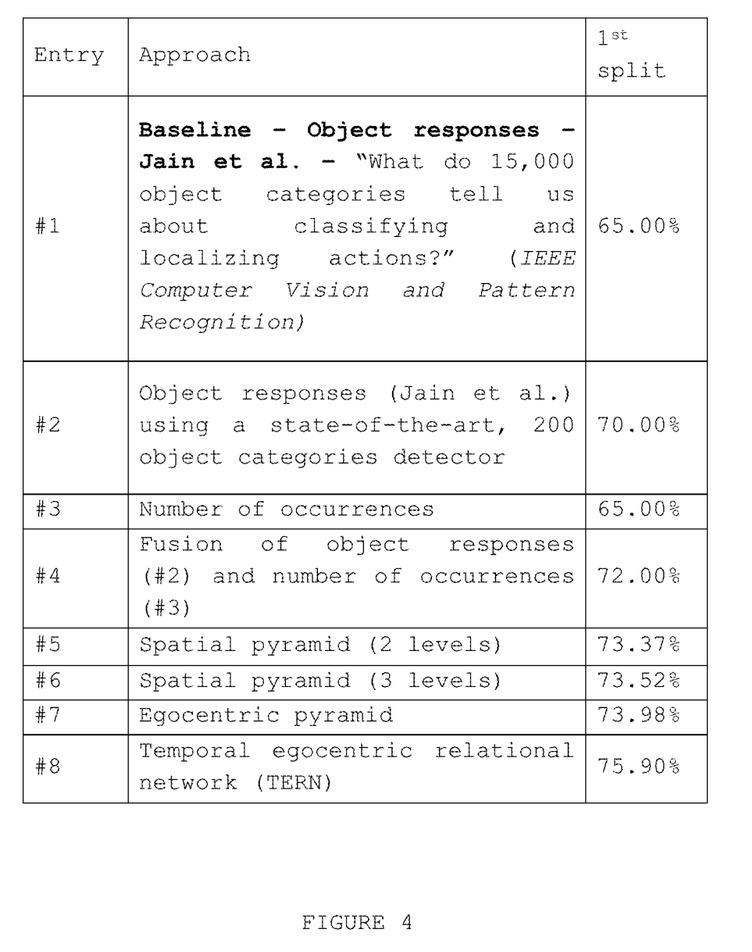
FIG. 4 shows experimental results of the proposed invention in comparison with baselines based on object occurrences.

Experiments on the UCF101 Human Activity Recognition dataset demonstrate the improvements in accuracy over existing baselines when using the proposed invention. Initially, preliminary experiments are conducted on the 1st split of the UCF101 dataset to evaluate egocentric pyramid alone and baselines based on object occurrences, namely, spatial pyramid, object scores as reported by Jain et al., the implementation using an object detector, and the extension based on occurrences. FIG. 4 shows experimental results of the proposed invention in comparison with baselines based on object occurrences. FIG. 4 summarizes the results. First, it can be seen that using the SSD detector to reproduce the baseline yields a gain of 5 percentage points (p.p.) when compared to the original report by Jain et al. ("What do 15,000 object categories tell us about classifying and localizing actions?", Jain et al., CVPR, 2015). In addition, by evaluating the representation of number of occurrences alone, a similar result to the baseline (65%) is achieved. It shows that occurrences by itself are not as representative as the object scores. Finally, combining both scores and occurrences an accuracy of 72% is obtained, which shows that they are complementary. Afterwards, the Temporal Egocentric Relational Network (TERN) deep learning architecture is evaluated. By comparing the TERN results with the egocentric pyramid alone, there is an improvement of 1.92 p.p., which suggests that there are other non-explicit contextual features that can be exploited besides spatial arrangements, such as temporal cues from relative frame position and multi-snippets, and other spatial cues such as size and fine-grained localization.

Figure 5:
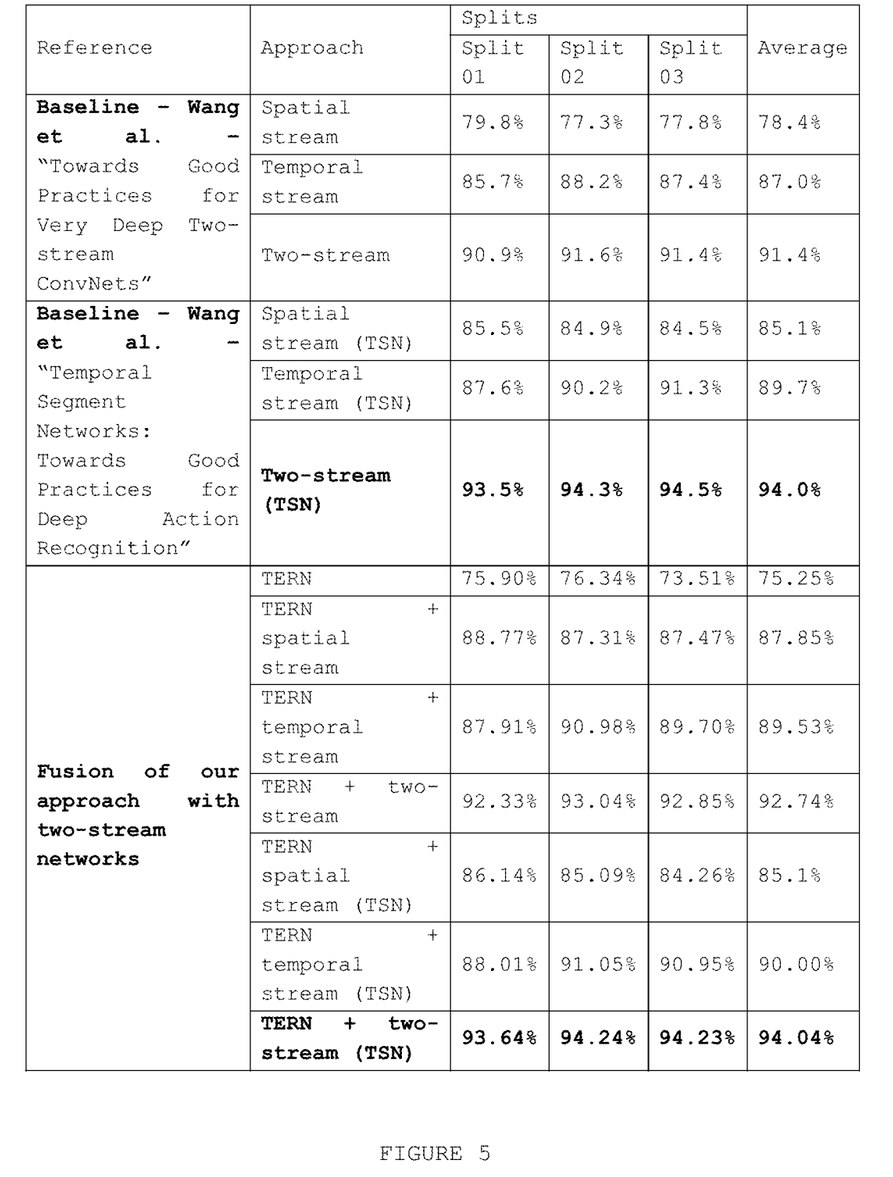
FIG. 5 shows experimental results of one embodiment of the proposed invention (TERN) fused with other state-of-the-art architectures for action recognition, which also consider motion information.

FIG. 5 shows experimental results of one embodiment of the proposed invention (TERN) fused with other state-of-the-art architectures for action recognition, which also consider motion information. Results show the competitiveness of the proposed invention with other approaches.

FIG. 5 presents TERN evaluated over the three UCF101 splits, where the last column is the average of the accuracies. These results are compared with the well-known two-stream networks, with modifications by Wang et al. ("Towards good practices for very deep two-stream convnets", Jain et al., arxiv, 2015). Results of Wang et al. were obtained by running the code provided by the authors. To make a fair comparison, the Temporal Segment Networks are also included. Compared to the spatial stream, TERN obtains a similar result, which might suggest that it is encoding part of the necessary spatial information encoded by the spatial stream. However, when the spatial stream is also imbued in the TSN framework, the gap between the two approaches increases. The reason might be that TSN enables the spatial convolutional network to learn temporally consistent visual patterns that are not available from object detections alone, such as scene/background and pose cues. Fusing TERN predictions with temporal stream yields an improvement close to two-streams itself, suggesting complementarity between the two modalities. Comparing to two-stream alone, it should be noticed that the fusion of TERN+two-stream is able to slightly improve recognition (1.34 p.p.). However, this gain is smaller when fused with TSN (0.04 p.p.), showing a smaller complementarity between both approaches.

Figure 6:
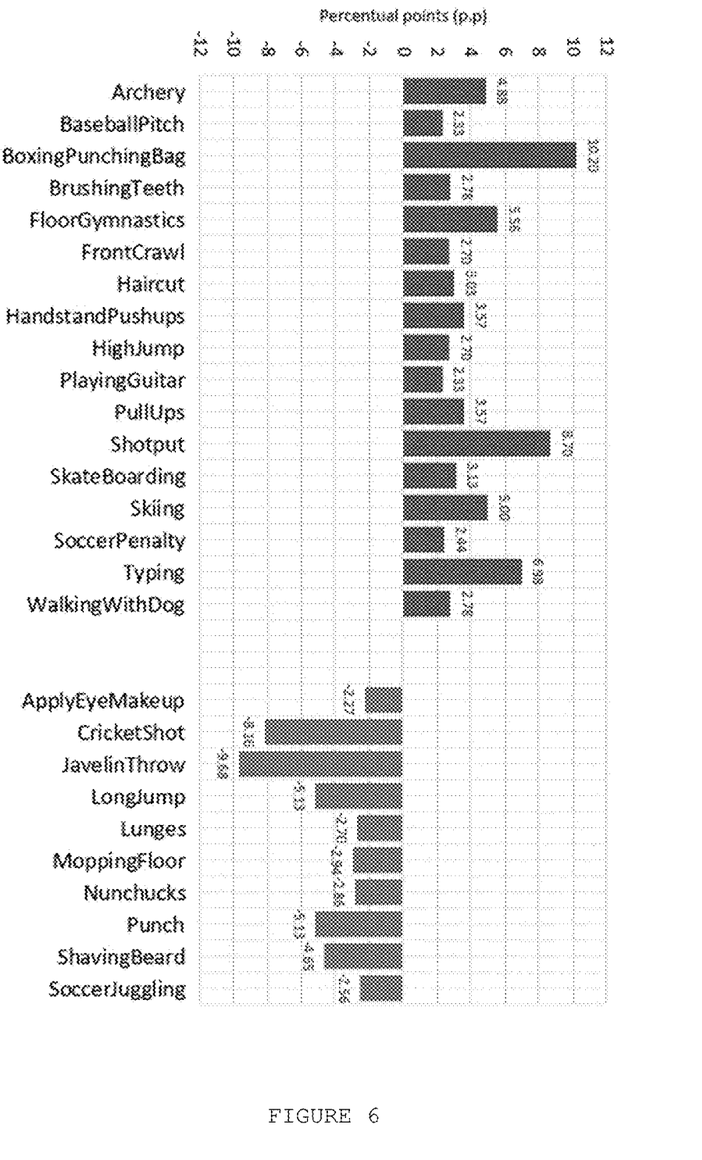
FIG. 6 presents the accuracy differences between the proposed invention alone (TERN) and the proposed invention fused with state-of-the-art approach (TERN+two-stream (TSN)).

FIG. 6 presents the accuracy differences between the proposed invention alone (TERN) and the proposed invention fused with state-of-the-art approach (TERN+two-stream (TSN)), showing which method is better for each activity classes (positive bars indicate that TERN alone is better). The graph shows that activities that have clear objects are easier to recognize by TERN, such as archery, boxing punching bag, shotput, and typing. However, TERN performed worse for classes in which objects are either difficult to detect (e.g., apply eye makeup), appearance and/or motion plays a major role (long jump, punch), or objects are absent among the detector categories (javelin throw).

To better understand how TERN and TSN affect each other, the difference in accuracy for each activity class regarding the fusion of TERN+two-stream (TSN) is analyzed. FIG. 6 shows a summary of the scenarios that TERN+two-stream (TSN) performed better (positive bars) and worse (negative bars) than two-stream (TSN) alone. Activities that have objects are easier to recognize, such as archery, boxing punching bag, shotput, and typing performed better, while TERN performed worse for classes that objects are either difficult to detect (apply eye makeup), appearance and/or motion plays a major role (long jump, punch), or objects are absent among the detector categories (javelin throw). Comparing TERN alone with TSN, TERN only performed better in situations that objects played an important role, such as playing guitar or horse riding. Still, appearance and motion perform better in most classes, as expected. However, as shown in FIGS. 5 and 6, there are activity categories that benefit from fusing it with TERN, suggesting that there are contextual cues that can be exploited by action recognition architectures besides appearance/motion.

Although the present disclosure has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

What is claimed is:

1. A method for video recognition using contextual features capable of encoding spatial and temporal relationships of concepts, the method comprising performing, by at least one processor, operations including:
   acquiring input video data from a video;
   processing the input video data to detect concepts in the video;
   computing contextual features from the detected concepts, wherein the computing contextual features includes:
      computing, by the Egocentric Pyramid, spatial relationships of detected concepts in relation to a main agent of the video as concept-agent pairings;
      computing pairings between concepts as concept-concept pairings; and
      making use of the computed pairings to determine temporal relationships of the concepts, using the Temporal Egocentric Relational Network, to generate prediction scores for the concepts; and
   outputting the generated prediction scores from the Temporal Egocentric Relational Network.

2. The method according to claim 1, wherein the acquiring input video data comprises splitting the video into t video segments of equal size T and then, from each video segment, sampling a random snippet $S_t$ with length $|S_t|$ such that $|S_t| \leq T$.

3. The method according to claim 1, wherein the computing contextual features from the detected concepts includes attributing scores to captured context to determine the concepts and agents in the video.

4. The method according to claim 3, wherein the Egocentric Pyramid considers as the main agent in the video to be the concept with the highest attributed score obtained by the detected concepts.

5. The method according to claim 1, wherein when more than one agent is in the video, a number of agents is a same number of Egocentric Pyramids, where each Egocentric Pyramid is considered a separate concept as the agent in the video.

6. The method according to claim 1, wherein the Temporal Egocentric Relational Network determines the temporal relationships from both egocentric pairings and concept pairings.

7. The method according to claim 1, wherein the Temporal Egocentric Relational Network determines the temporal relationships from egocentric pairings.

8. The method according to claim 1, wherein the Temporal Egocentric Relational Network determines the temporal relationships from concept pairings.

9. The method according to claim 1, wherein the Temporal Egocentric Relational Network uses the computed pairings to determine features and a classifier in a unified way.

10. The method according to claim 1, wherein the Temporal Egocentric Relational Network is configured to determine concept information over time.

11. The method according to claim 1, wherein the Temporal Egocentric Relational Network is defined as:

$$\text{TERN}(S) = \mathcal{G}(R_\Phi(S_1), R_\Phi(S_2), \ldots, R_\Phi(S_t)),$$

where $S_t$ is the video, $R_\Phi$ is a relational network with parameters $\Phi$, $\mathcal{G}$ is a pooling operation and the relational network $R_\Phi$, given parameters $\Phi=[\phi_1,\phi_2]$, is defined as $R_\Phi(O)=f_{\phi_1}(1/n^2 \Sigma_{o_i,o_j} g_{\phi_2}(o_i, o_j))$, where $O=\{o_i\}_{i=1}^n$ represents an input set of n detected concepts (e.g., objects), where $o_i$ is the i-th concept such that $o_i \in \mathbb{R}^f$; and functions $f_{\phi_1}$ and $g_{\phi_2}$ are stacked multi-layer perceptrons (MLP) parameterized by parameters $\phi_1$ and $\phi_2$, respectively.

* * * * *

UNITED STATES PATENT AND TRADEMARK OFFICE
CERTIFICATE OF CORRECTION

PATENT NO. : 11,416,774 B2
APPLICATION NO. : 16/849350
DATED : August 16, 2022
INVENTOR(S) : Jesimon Barreto Santos et al.

It is certified that error appears in the above-identified patent and that said Letters Patent is hereby corrected as shown below:

On the Title Page

Item (73), Assignees Name, delete ""SAMSUNG ELECTRONICA DA AMAZONIA LTDA." and insert -- SAMSUNG ELETRÔNICA DA AMAZÔNIA LTDA. --.

Signed and Sealed this
Twenty-seventh Day of June, 2023

Katherine Kelly Vidal
*Director of the United States Patent and Trademark Office*